(12) United States Patent
Vasseur et al.

(10) Patent No.: US 8,131,873 B2
(45) Date of Patent: Mar. 6, 2012

(54) TECHNIQUE FOR SELECTING A PATH COMPUTATION ELEMENT

(75) Inventors: Jean-Philippe Vasseur, Dunstable, MA (US); David D. Ward, Somerset, WI (US); Muthurajah Sivabalan, Kanata (CA); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 10/983,280

(22) Filed: Nov. 5, 2004

(65) Prior Publication Data

US 2006/0101142 A1 May 11, 2006

(51) Int. Cl.
*G06F 15/173* (2006.01)
(52) U.S. Cl. ........................ 709/242; 709/203
(58) Field of Classification Search .................. 709/242
See application file for complete search history.

(56) References Cited

U.S. PATENT DOCUMENTS

| | | | | |
|---|---|---|---|---|
| 5,289,462 A * | 2/1994 | Ahmadi et al. | ............... | 370/232 |
| 6,377,975 B1 * | 4/2002 | Florman | ............... | 709/203 |
| 6,493,317 B1 | 12/2002 | Ma | | |
| 6,651,101 B1 | 11/2003 | Gai et al. | | |
| 6,665,273 B1 | 12/2003 | Goguen et al. | | |
| 6,721,272 B1 | 4/2004 | Pernafes et al. | | |
| 6,788,692 B1 * | 9/2004 | Borden et al. | ............... | 370/400 |
| 6,795,858 B1 | 9/2004 | Jain et al. | | |
| 7,711,803 B2 * | 5/2010 | Doshi et al. | ............... | 709/223 |
| 7,882,501 B1 * | 2/2011 | Carlson et al. | ............... | 717/167 |
| 2002/0018264 A1 | 2/2002 | Kodialam et al. | | |
| 2002/0103930 A1 | 8/2002 | Kamentsky et al. | | |
| 2002/0141345 A1 * | 10/2002 | Szviatovszki et al. | ........ | 370/238 |
| 2003/0061353 A1 | 3/2003 | Johnson et al. | | |
| 2003/0204619 A1 | 10/2003 | Bays | | |

FOREIGN PATENT DOCUMENTS

EP 05823135.8 5/2010

OTHER PUBLICATIONS

Rekhter, Y., RFC 1771, entitled A Border Gateway Protocol 4 (BGP-4), Mar. 1995, pp. 1-28.
Moy, J., RFC 2328, entitled OSPF Version 2, Apr. 1998, pp. 1-183.
Coltun, R., RFC 2370, entitled The OSPF Opaque LSA Option, Jul. 1998, pp. 1-13.
Callon, R., RFC 1195, entitled Use of OSI ISIS for routing in TCP/IP and Dual Environments, Dec. 1990, pp. 1-80.
Awduche, D. et al., RFC 3209, entitled RSVP-TE: Extensions to RSVP for LSP Tunnels Dec. 2001, pp. 1-43.

(Continued)

*Primary Examiner* — Christopher Biagini
(74) *Attorney, Agent, or Firm* — Cesari and McKenna, LLP (57) ABSTRACT

A technique efficiently selects a Path Computation Element (PCE) to compute a path between nodes of a computer network. The PCE selection technique is illustratively based on dynamic advertisements of the PCE's available path computation resources, using (i) a low-pass filter algorithm to compute such resources, and (ii) threshold determinations to control distribution of those advertisements. To that end, the novel technique enables one or more PCEs to dynamically send (advertise) their available path computation resources to a Path Computation Client (PCC) by way of the controlled advertisements. In addition, the technique enables the PCC to efficiently select a PCE (or set of PCEs) to service a path computation request based upon those available resources.

17 Claims, 7 Drawing Sheets

OTHER PUBLICATIONS

Smit, H., RFC 3784, entitled Intermediate-System-to-Intermediate-System (IS-IS) Extensions for Traffic Engineering (TE), Jun. 2004, pp. 1-13.

Katz, D. et al., RFC 3630, entitled Traffic Engineering (TE) Extensions to OSPF Version 2, Sep. 2003, pp. 1-14.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Vasseur, J.P. et al., OSPF MPLS Traffic Engineering Capabilities(draft-vasseur-ospf-te-caps-00.txt), Internet Draft, Jul. 2004, pp. 1-14.

Vasseur, J.P. et al., RSVP Path Computation Request and Reply Messages (draft-vasseur-mpls-computation-rsvp-05.txt), Internet Draft, Jul. 2004, pp. 1-31.

Braden, R. et al., RFC 2205, entitled Resource ReSerVation Protocol (RSVP), Version 1 Functional Specification, Sep. 1997, pp. 1-112.

Vasseur, J.P. et al., IS-IS Traffic Engineering Capabilities (draft-vasseur-isis-te-caps-00.txt), Internet Draft, Jul. 2004, pp. 1-15.

Farrel, A. et al., entitled draft-ash-pce-architecture-00.txt Path Computation Element (PCE) Architecture, IETF Internet Draft, Sep. 2004, pp. 1-18.

Lindem, A et al., Extensions to OSPF for Advertising Optional Router Capabilities (draft-ietf-ospf-cap-03.txt), Internet Draft, Feb. 2005, pp. 1-8.

Rekhter, Y., RFC 1771, entitled A Border Gateway Protocol 4 (BGP-4), Mar. 1995, pp. 1-54.

"Notification of Transmittal of the International Search Report and the Written Opinion of the International Searching Authority, or the Declaration," International Filing Date: Nov. 3, 2005, International Application No. PCT/US2005/39985, Applicant: CISCO Technology, Inc., Date of Mailing: Aug. 1, 2008, pp. 1-12.

Farrel, A. et al., "A Framework for Inter-Domain MPLS Traffic Engineering," Network Working Group, IETF Draft (draft-ietf-ccamp-inter-domain-framework-00.txt), Aug. 2004, pp. 1-15.

Farrel, A. et al., "Path Computation Element (PCE) Architecture," IETF Internet Draft PCE Working Group, IETF Draft (draft-ietf-pce-architecture-00.txt), Mar. 2005, pp. 1-22.

* cited by examiner

TECHNIQUE FOR SELECTING A PATH COMPUTATION ELEMENT

BACKGROUND OF THE INVENTION

1. Field of the Invention

The present invention relates to computer networks and, more particularly, to selecting path computation elements for computing paths through a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Computer networks may be further interconnected by an intermediate node, such as a router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. It may also be desirable to interconnect various ASes that are operated under different administrative domains. As used herein, a router that connects different areas or ASes together is generally referred to as a border router. In the case of areas rather than ASes since the routers are under a common authority, a single router may in fact serve as an exit border router of one area and an entry border router of another area.

An example of an interdomain routing protocol is the Border Gateway Protocol version 4 (BGP), which performs routing between ASes by exchanging routing and reachability information among neighboring interdomain routers of the systems. An adjacency is a relationship formed between selected neighboring (peer) routers for the purpose of exchanging routing information messages and abstracting the network topology. BGP generally operates over a reliable transport protocol, such as the Transmission Control Protocol (TCP), to establish a TCP connection/session. The BGP protocol is well known and generally described in Request for Comments (RFC) 1771, entitled *A Border Gateway Protocol 4 (BGP-4)*, published March 1995, which is hereby incorporated by reference.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in an AS or area. This information is generally directed to an intradomain router's local state (e.g., the router's usable interfaces and reachable neighbors or adjacencies). In the case of ISIS, the local state is exchanged using link-state packets, whereas in the case of OSPF, the information is exchanged using link state advertisements (LSAs). The term "LSA" is used herein to generally reference both types of information exchange. The OSPF protocol is described in RFC 2328, entitled *OSPF Version 2*, dated April 1998 and the ISIS protocol is described in RFC 1195, entitled *Use of OSI ISIS for routing in TCP/IP and Dual Environments*, dated December 1990, both of which are hereby incorporated by reference.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels*, dated December 2001, RFC 3784 entitled *Intermediate-System-to-Intermediate-System (IS-IS) Extensions for Traffic Engineering (TE)*, dated June 2004, and RFC 3630, entitled *Traffic Engineering (TE) Extensions to OSPF Version 2*, dated September 2003, the contents of all of which are hereby incorporated by reference in their entirety.

Establishment of an MPLS TE LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE LSPs can be configured within a single IGP area or may also span multiple IGP areas or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other requests from other PCCs. It is important to note that when one PCE sends a request to another PCE, it acts as a PCC. PCEs conventionally have limited or no visibility outside of its surrounding area or AS. A PCC can be informed of a PCE either by pre-configuration by an administrator, or by a PCE Discovery (PCED) message ("advertisement"), which is sent from the PCE within its area or across the entire AS to advertise its services.

One difficulty that arises in crossing AS boundaries is that path computation at the head-end LSR requires knowledge of network topology and resources across the entire network between the head-end and the tail-end LSRs. Yet service providers typically do not share this information with each other across AS borders. Neither the head-end LSR nor any single PCE will have sufficient knowledge to compute a path. Because of this, MPLS Traffic Engineering path computation techniques are required to compute inter-domain TE LSPs. A similar problem arises in computing the paths of MPLS Traffic Engineering LSPs across areas. Network topology and resource information do not generally flow across area boundaries even though a single service provider may operate all the areas.

The use of PCEs has been adapted to create a distributed PCE architecture, in order to extend MPLS TE LSPs across AS or area boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent areas and ASes so that PCEs may cooperate to compute paths across multiple areas or ASes by exchanging virtual shortest path trees (VSPTs) while preserving confidentiality across ASes. VSPTs, which may be represented as virtual links made of "loose hops," are used because service providers may desire to maintain their internal network architectures and designs confidential. One way to compute the VSPTs is by using a virtual shortest path tree (VSPT) algorithm. Generally, a VSPT is a compressed path description (entry and exit/destination points of areas/ASes) that informs a previous PCE that a destination can be reached from a particular entry to a particular exit in such a way that the internal path specifics are kept confidential from an adjacent area or AS. The virtual links that compose the VSPT will generally have an associated network cost for each calculated link. It should be noted that in the context of multiple ASes operating under a common authority (e.g. a unique service provider), such virtual links may also specify an entire path. A set of virtual links may be further organized (in certain protocols) within an explicit route object (ERO) to facilitate transfer of the compressed path descriptions to the previous PCE.

In some areas or ASes, it may be desirable to use multiple PCEs within the same adjacent area or AS to alleviate the load on any one PCE in particular and to avoid any single point of failure. In this case, a PCC may receive notification through multiple PCED advertisements that more than one PCE exists. Consequently, a PCC requesting the computation of a path, e.g., an MPLS inter-domain Traffic Engineering LSP, by means of the VSPT algorithm, for example, must first determine to which PCE it can send its path computation request. In addition to informing PCCs that it can act as a PCE for either inter-area and/or inter-AS Traffic Engineering path computation, a PCE can also inform the PCCs of its path computation capabilities, generally through the use of Type/Length/Value (TLV) encoding formats. Examples of TLV encoding formats used to specify MPLS Traffic Engineering capabilities are described in *OSPF MPLS Traffic Engineering Capabilities* (draft-vasseur-ospf-te-caps.txt) published July 2004, and *IS-IS Traffic Engineering Capabilities* (draft-vasseur-isis-te-caps.txt) published July 2004, both by Vasseur et al., both of which are expressly incorporated by reference in their entirety. These computation capabilities include, but are not limited to, the ability to compute local paths, inter-area paths, multi-domain paths, etc.

When there are multiple PCE "candidates," however, a PCC does not have sufficient information to adequately select a PCE based on its actual available path computation resources. This may lead to highly sub-optimal choices since a path computation request may be directed to an overloaded PCE which would result in increasing the path computation time (and consequently the path set up time). This is particularly true in environments where a large amount of requests are sent so as to reroute or reoptimize many paths after a network element failure or restoration.

Thus, there is a need for a system and method to advertise a PCE's available path computation resources, and for a system and method for a PCC to additionally select the optimal PCE based upon those resources.

SUMMARY OF THE INVENTION

The present invention is directed to a technique for efficiently selecting a Path Computation Element (PCE) to compute a path between nodes of a computer network. The PCE selection technique is illustratively based on dynamic advertisements of the PCE's available path computation resources, using (i) a low-pass filter algorithm to compute such resources, and (ii) threshold determinations to control distribution of those advertisements. To that end, the novel technique enables one or more PCEs to dynamically send (advertise) their available path computation resources to a Path Computation Client (PCC) by way of the controlled advertisements. In addition, the technique enables the PCC to efficiently select a PCE (or set of PCEs) to service a path computation request based upon those available resources.

In accordance with an aspect of the present invention, a PCE advertises its available path computation resources via a load metric contained in the advertisement. Notably, the load metric is a Path Computation Resource (PCR) that represents, e.g., the number of requests per second that the PCE can handle, the average service time of a request, the available processing (CPU) resources, and others. The PCE may send these advertisements to the PCCs on specified time intervals or when predetermined thresholds determinations (such as, e.g., a predetermined low threshold or a predetermined increase or decrease rate of change threshold) are met, reflecting a substantial change to the available PCE path computation resources. This aspect of the invention also includes the interaction between the low-pass filter algorithm and the threshold determinations to limit potential network oscillation caused by the advertised PCRs.

In the illustrative embodiment described herein, the controlled advertisements are embodied as link-state advertisements (LSAs) containing type/length/value (TLV) encoded formats that advertise various capabilities of the PCE. According to another aspect of the invention, a novel sub-TLV is defined to carry the advertised PCR. The PCR sub-TLV is preferably contained within a PCE discovery (PCED) TLV of the LSA.

In response to receiving the dynamically advertised PCR, the PCC selects a PCE to service its path computation request based on the PCE's advertised capabilities and PCR. The advertised capabilities of a PCE are considered because not all PCEs may be capable of performing the requested path computation. In the case of multiple available PCE "candidates," the advertised PCR metric is used to select an appropriate PCE to service the request. Moreover, if the PCC requests multiple path computations in connection with a set of path computation requests, those requests may be apportioned among the multiple available PCE candidates to attain an optimal PCE response time. To that end, this aspect of the invention further provides a novel PCE selection algorithm that effectively load balances the set of requests among the PCE candidates in proportion to their advertised PCR ratios.

Advantageously, the novel technique efficiently selects an appropriate PCE to compute a path, such as a Traffic Engineering (TE) label switched path (LSP), between nodes of a network to thereby reduce a set-up time for the TE LSP. TE LSP set-up times are generally critical to TE sensitive applications and, thus, reduction of those times are desirable. By selecting an appropriate PCE, or, in the case of multiple PCEs, efficiently load balancing a set of requests among the PCEs, PCE overload is obviated, thus reducing the TE LSP set-up time for a computed path.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1A:
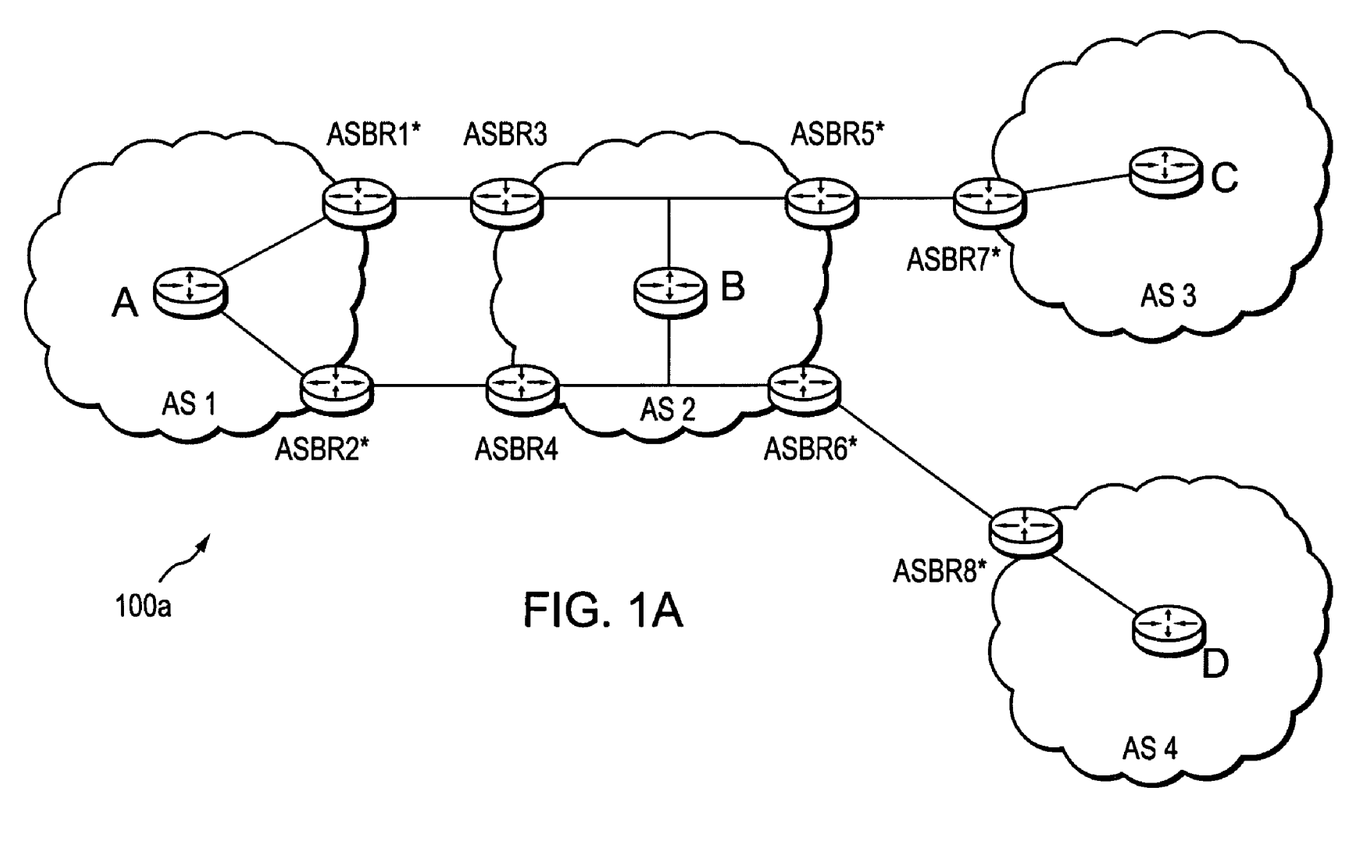
FIG. 1A is a schematic block diagram of an exemplary computer network of autonomous systems that may be used in accordance with the present invention.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively. Those skilled in the art will understand that any number of routers may be used in the ASes, and that the view shown herein is for simplicity.

Data packets may be exchanged among the autonomous systems AS1-AS4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements (LSAs) or link-state packets. In addition, data packets containing network routing information may be exchanged among the autonomous systems AS1-AS4 using "external" gateway protocols, such as the Border Gateway Protocol (BGP).

Figure 1B:
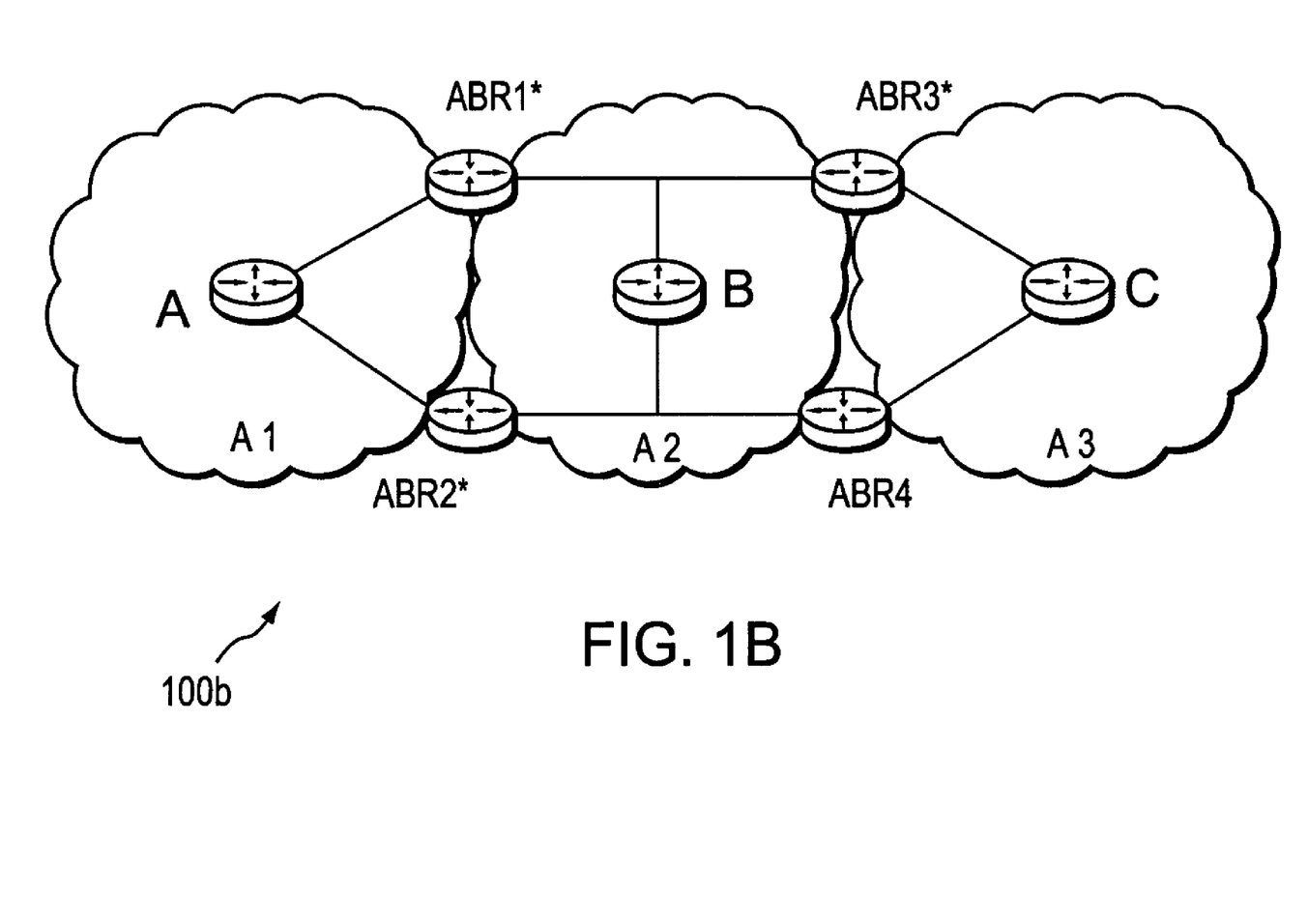
FIG. 1B is a schematic block diagram of an exemplary computer network of areas that may be used in accordance with the present invention.

FIG. 1B is a schematic block diagram of an exemplary computer network 100b comprising areas A1, A2, and A3, each having at least one intradomain router, A, B, and C, respectively. In addition, A1 and A2 share border routers ABR1* and ABR2*, while A2 and A3 share ABR3* and ABR4. As used herein, area is a collection of routers that share full network topology information with each other but not necessarily with routers outside the area. The term area as used herein also encompasses the term "level" which has a similar meaning for networks that employ IS-IS as their IGP. These examples are merely representative. Furthermore, the techniques described below with reference to inter-AS path computation may be used in the context of inter-area path computation and, under certain conditions, the techniques described with reference to inter-area path computation may be used for inter-AS path computation. It will be understood by those skilled in the art that wherever autonomous systems are referred to, areas may be used also.

Figure 2:
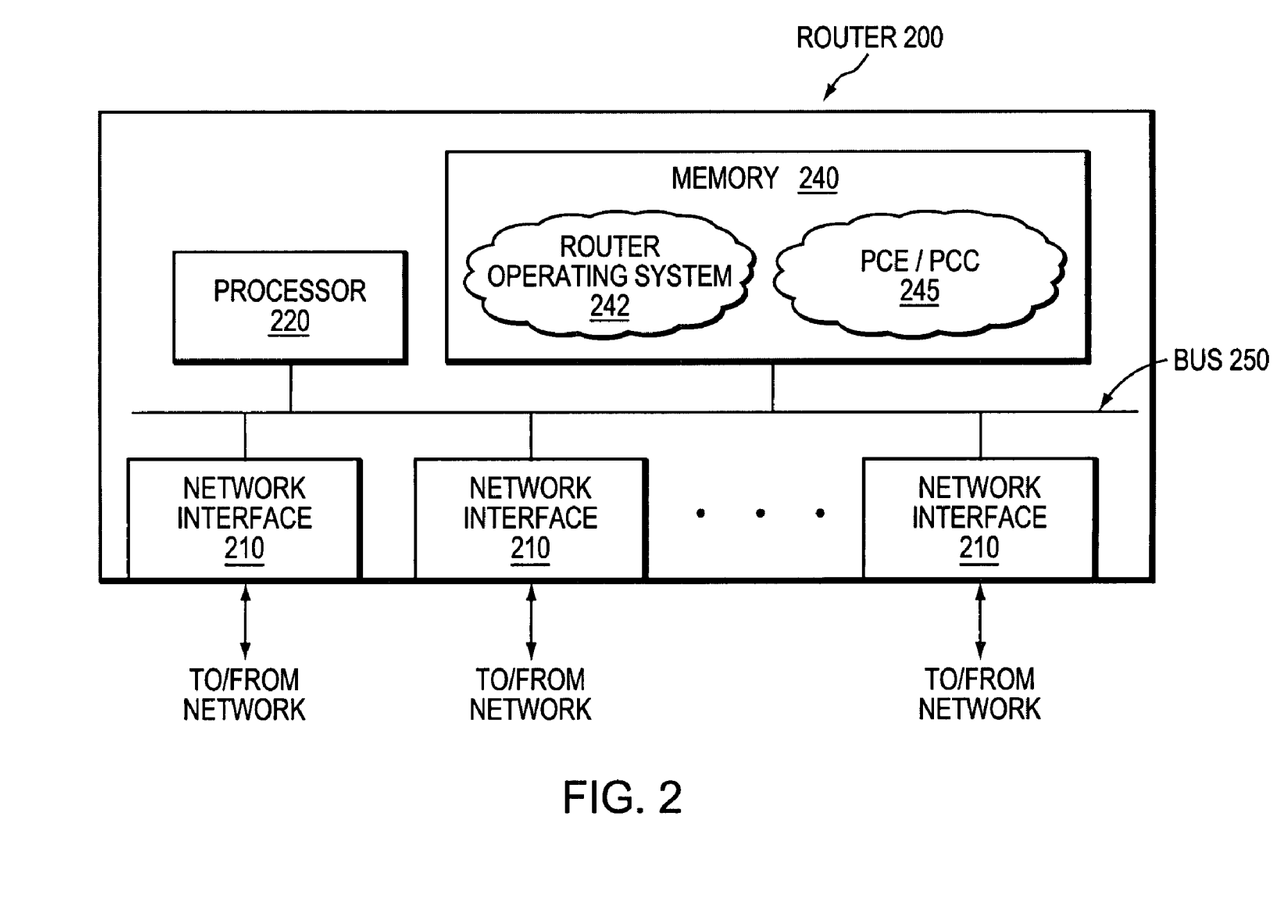
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100a,b. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210. The processor 220 may comprise necessary elements or logic adapted to execute the software programs and manipulate the data structures. A router operating system 242, portions of which are typically resident in memory 240 and executed by the processor, functionally organizes the router by, inter alia, invoking network operations in support of software processes, such as PCC/PCE process 245, executing on the router. It will be apparent to those skilled in the art that other processor and memory means, including various computer-readable media, may be used to store and execute program instructions pertaining to the inventive technique described herein.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs). Establishment of an LSP requires computation of a path, signaling along the path, and modification of forwarding tables along the path. MPLS Traffic Engineering establishes LSPs that have guaranteed bandwidth under certain conditions.

Although the illustrative embodiment described herein is directed to MPLS, it should be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple areas or ASes, above-referenced U.S. application Ser. No. 10/767,574 describes the use of a virtual shortest path tree (VSPT) algorithm in a distributed path computation element (PCE) architecture, which has been incorporated by reference herein. According to the VSPT algorithm, for an inter-AS path computation example such as in FIG. 1A, a PCC (Router A) first sends a path computation request to a known local PCE in its AS, such as ASBR1*, to compute a path to a destination (e.g., a tail-end LSR) such as Router C in AS3. As an example, border routers marked with '*' in FIGS. 1A and 1B are PCE enabled border routers. The address of the local PCE may be manually configured. Alternatively, the PCE may advertise itself through flooding within the AS. Path computation element discovery (PCED) techniques can be used in accordance with *OSPF MPLS Traffic Engineering Capabilities* by Vasseur, et al., incorporated by reference above. A PCED message may include indications of PCE capabilities, such as the ability to compute local paths, inter-area paths, inter-AS paths, multi-domain paths, diverse paths, etc. In the illustrative embodiment, a PCED may be contained within a conventional OSPF LSA, generally through the use of a type/length/value (TLV) encoding format.

Figure 3:
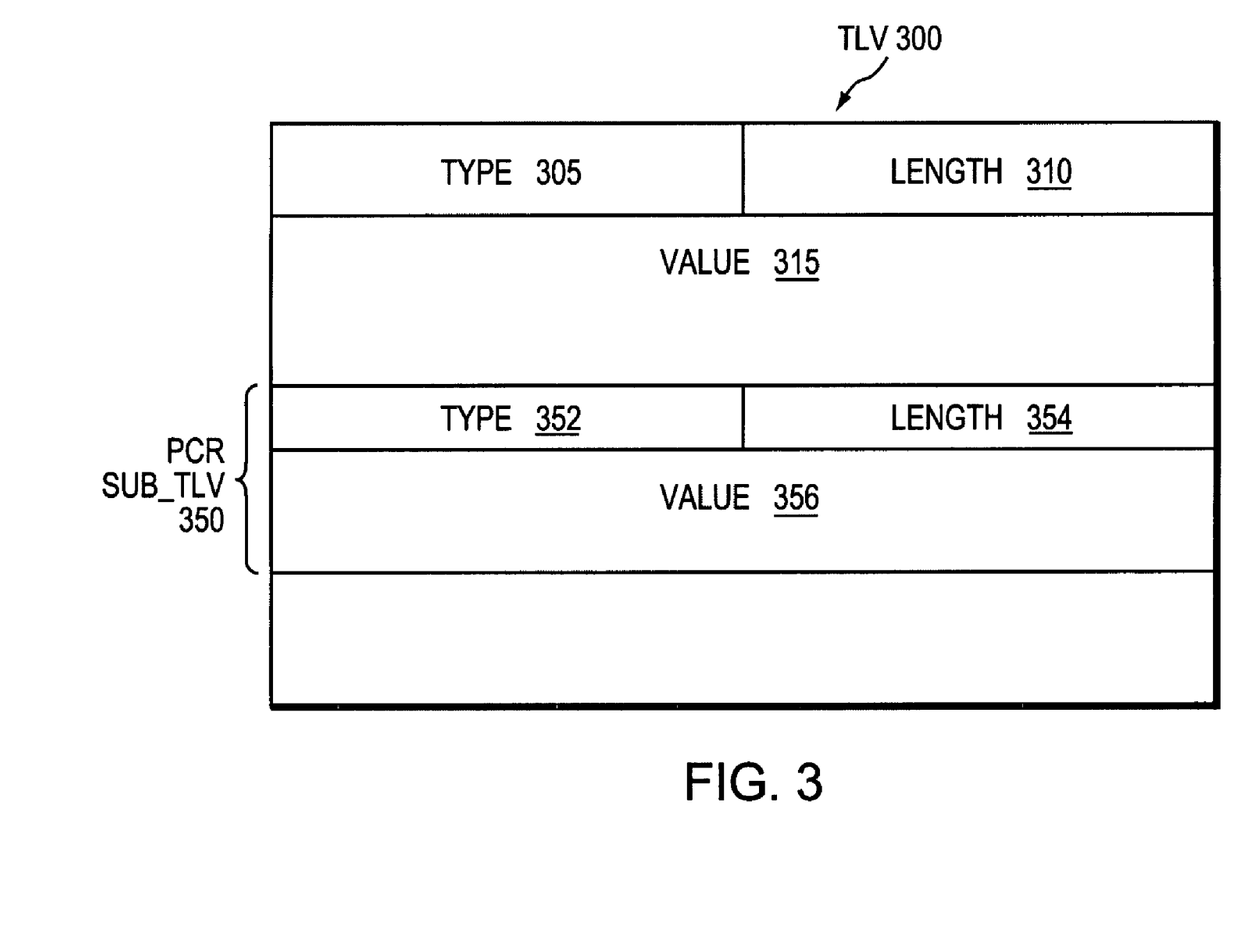
FIG. 3 is a schematic block diagram illustrating an encoding format that may be advantageously used with the present invention.

FIG. 3 is a schematic block diagram illustrating a TLV encoding format that may be advantageously used with the present invention. The TLV encoding format is a general way to communicate information between nodes, such as routers, where the information may not be entirely known to one router. The TLV "attribute" 300 is used to identify a type (T) of information being communicated (conveyed), a length (L) of information to be conveyed and a value (V) of the actual information conveyed. The length (L) parameter contained in the length field 310 is typically implementation-specific and can denote the length from the beginning of the Type field 305 of the attribute 300 to the end. However, the length generally denotes the length of the Value (V) field 315 and not the Type (T) or Length (L) fields.

As noted, the TLV encoded format is used to carry the PCED within the LSA when advertising capabilities of a PCE. The PCED TLV comprises a set of non-ordered sub-TLVs carried within the TLV "payload" (e.g. Value field 315), that define the PCE capabilities. As described further herein, a novel sub-TLV 350 is defined to carry a new PCE capability in accordance with an aspect of the present invention.

The path computation request (and response) can be made in accordance with a protocol specified in Vasseur, et al. *RSVP Path Computation Request and Reply Messages*, Internet Draft, July 2004, which is hereby incorporated by reference as though fully set forth herein. The path computation request is then passed to a PCE in every AS (AS1, AS2, AS3) on the way to the destination. Knowledge of the other PCE addresses may be acquired by way of static configuration or BGP advertisements, as could be readily devised by one of skill in the art. It should be understood that the use of RSVP serves only as an example, and that other communication protocols may be used in accordance with the present invention.

Once reached by the path computation request, the PCE (ASBR7*) in the final AS (AS3) containing the destination (Router C) computes a VSPT, which is a shortest path tree rooted at the destination and includes the set of shortest path (s) satisfying a set of required constraints from this destination to every border router of the area. This may be computed using a CSPF (constrained shortest path first) algorithm as known in the art or any other suitable algorithm. The PCE of the final area then sends the VSPT to the previous AS's (AS2) PCE (ASBR5*) with a virtual link (or a "loose hop"). The VSPT optionally uses the loose hop in such a way that hops internal to an AS and their costs remain confidential. A loose hop may have a single associated cost that is a combination or representation of internal costs. If multiple equal-cost paths are found, a PCE may provide some or all of them to the requesting PCC. Other situations where a PCE may return more than one path include, e.g., where the PCC requests the computation of diverse paths. These diverse paths may or may not have equal costs.

The PCE (ASBR5*) in the previous AS now repeats the VSPT algorithm, and concatenates the VSPT it received from the final PCE (ASBR7*) with the topology of its own AS (AS2) (including the inter-AS links) to compute new paths. This process repeats through all ASes until the response reaches the originating PCC (Router A). For this reason the VSPT algorithm is referred to as a "recursive backward path computation."

When the above described procedure completes at the originating PCC, the path in the response consists of a series of hops to the destination along the path. Notably, hops may be loose wherever the network is to be kept confidential. In this case, the complete computed path can be thought of as a basic path through the ASes that consists only of the entry and exit points of each confidential AS. The following is an example of the contents of such a computed path, also known as an explicit route object (ERO): "ASBR1*, ASBR3, ASBR5* (L), ASBR7*, Router C (L)," where "(L)" denotes a loose hop. The PCC can then establish a tunnel (e.g. LSP) to the destination by forwarding a path establishment request over the computed path (in the ERO) to the exit border router of its area or AS. It should be understood that in an area architecture, the exit border router is the entry border router for the next area. This next border router then computes the specific path to the next exit border as specified by the next loose hop in the ERO. That exit border router thereafter repeats the procedure according to the ERO, and so on, until the destination is again reached, and a tunnel is created according to methods known in the art.

The present invention is directed to a technique for efficiently selecting a PCE to compute a path between nodes of a computer network. The PCE selection technique is illustratively based on dynamic advertisements of the PCE's available path computation resources, using (i) a low-pass filter algorithm to compute such resources, and (ii) threshold determinations to control distribution of those advertisements. To that end, the novel technique enables one or more PCEs to dynamically send (advertise) their available path computation resources to the PCCs by way of the controlled advertisements. In addition, the technique enables the PCC to efficiently select a PCE (or set of PCEs) to service a path computation request based upon the capabilities of the PCE and its available resources.

PCE Advertisement

In accordance with an aspect of the present invention, a PCE advertises its available path computation resources via a load metric contained in the advertisement. Notably, the load metric is a Path Computation Resource (PCR) that represents, e.g., the number of requests per second that the PCE can handle, the average service time of a request, the available processing (CPU) resources, and others. It is important to note that examples given for the present invention may use one metric or another, and that any metric may be used in the same manner and still be within the scope and protection of the present invention. It is desirable, although not necessary, to use the same PCR metric across each PCE in a network for ease of comparison, as described in detail below.

In the illustrative embodiment described herein, the controlled advertisements are embodied as LSAs containing TLV encoded formats that advertise various capabilities of the PCE. According to another aspect of the invention, a novel sub-TLV is defined to carry the advertised PCR. The PCR sub-TLV is preferably contained within a PCE discovery (PCED) TLV of the LSA. The PCR sub-TLV has a predetermined type 352 and length 354 that is dependent upon the content of the PCR contained in the Value field 356. These advertisements are similar to the PCED messages discussed above, and are dynamic in that information is refreshed as the PCE is operating.

Upon initialization (booting), a PCE does not advertise any PCE capability until the PCE process 245 (or the global process in the case of a single process operating system) can get its processor (CPU) share so as to avoid the receipt of path computation requests while the PCE is still in some initialization phase. It is important to note that this may either be done by an explicit notification or by advertising no availability through the PCR. When a PCE is first loaded, a system administrator may set certain configurations for the PCE availability that may be used as the PCR load metrics. For instance, in FIG. 1A, ASBR1* may be configured to dedicate 20% of its CPU resources to the PCE process 245. This configuration may, as an example, be advertised as a PCR from ASBR1* as either 20% CPU availability, or as a specific metric, such as a one hundred requests per second availability. Each PCE may be configured with a different allowance of resources, yet it is important to note that each PCE may not have equal resources to is distribute. In other words, in FIG. 1A, ASBR1* and ASBR2* may both dedicate 20% of CPU resources, but for ASBR2* that might only result in a twenty requests per second availability, as opposed to ASBR1*'s one hundred requests per second. As the PCE receives path computation requests from one or more PCCs, the PCE updates the metrics, and advertises a new updated PCR in accordance with the present invention. For example, if the original PCR was one hundred requests per second availability and twenty PCC requests are received per second, the new PCR will be eighty requests per second availability.

In accordance with an aspect of the present invention, the PCE employs an algorithm similar to a low pass filter to determine the value of the current PCR to advertise, based on the previous PCR value (PCR_old) and a current PCR value (PCR_new):

$$PCR=(1-x1)PCR\_old+(x1)PCR\_new$$

To determine the degree of the change allowed in transmission of the PCR, a configurable variable 'x1' is used, and may be set by, e.g., a system administrator of the PCE. In the above equation, x1 can range from zero to one. A higher value for x1 will result in a more precise PCR and quicker reaction to availability. Such high values may also result in oscillation as addressed below. A lower value for x1 will be a more conservative approach resulting in a smoother average of PCRs. For example, using a value of 0.2 for x1 in the equation, with a PCR_old of one hundred requests per second, and PCR_new of eighty requests per second, one gets:

$$PCR=(0.8*100)+(0.2*80)$$

such that $$PCR=96$$

One can see from the above that 80% of the PCR_old value and 20% of the PCR_new value is used, which results in a PCR value of 96 requests per second. This value of x1 produces a conservative change to the PCR, since more of the previous value is used. It should be understood by those skilled in the art that above equation is an example, and that other equations or algorithms are possible, such as including the use of different variables for PCR_old and PCR_new, where such equations are within the scope of the present invention.

By transmitting the current PCR, precise measures of PCE availability become known to the peer PCCs at the time the PCRs are advertised. In some circumstances, this is a desirable characteristic, such as when the network is designed for precision and is equipped to handle any oscillation that may occur. An example of how oscillation might occur is as follows. Assume that a first PCE transmits a PCR that advertises availability for one hundred requests per second. After receiving this PCR, peer PCCs may rapidly transmit ninety-nine requests, leaving availability for only one more request. Should the first PCE immediately transmit a PCR that indicates it can receive only one more request per second, the peer PCCs may select a second PCE and redirect their requests. In this somewhat extreme example, the first PCE will again have one hundred requests per second availability, while the second PCE will be inundated with requests, and the cycle repeats itself. In networks where the oscillation is less extreme, this may be an acceptable feature.

Some network architectures, however, may wish to have limited oscillation of PCE selection traffic. Too much oscillation may result in network control plane churn, where the rate of change is too high for the systems to control and keep up with the changes, possibly causing instability on the PCEs in the network. To alleviate this situation, the PCE may send these advertisements to the PCCs on specified time intervals or when predetermined thresholds determinations (such as, e.g., a predetermined low threshold or a predetermined increase or decrease rate of change threshold) are met, reflecting a substantial change to the available PCE path computation resources. This aspect of the invention also includes the interaction between the low-pass filter algorithm and the threshold determinations to limit potential network oscillation caused by the advertised PCRs.

Figure 4:
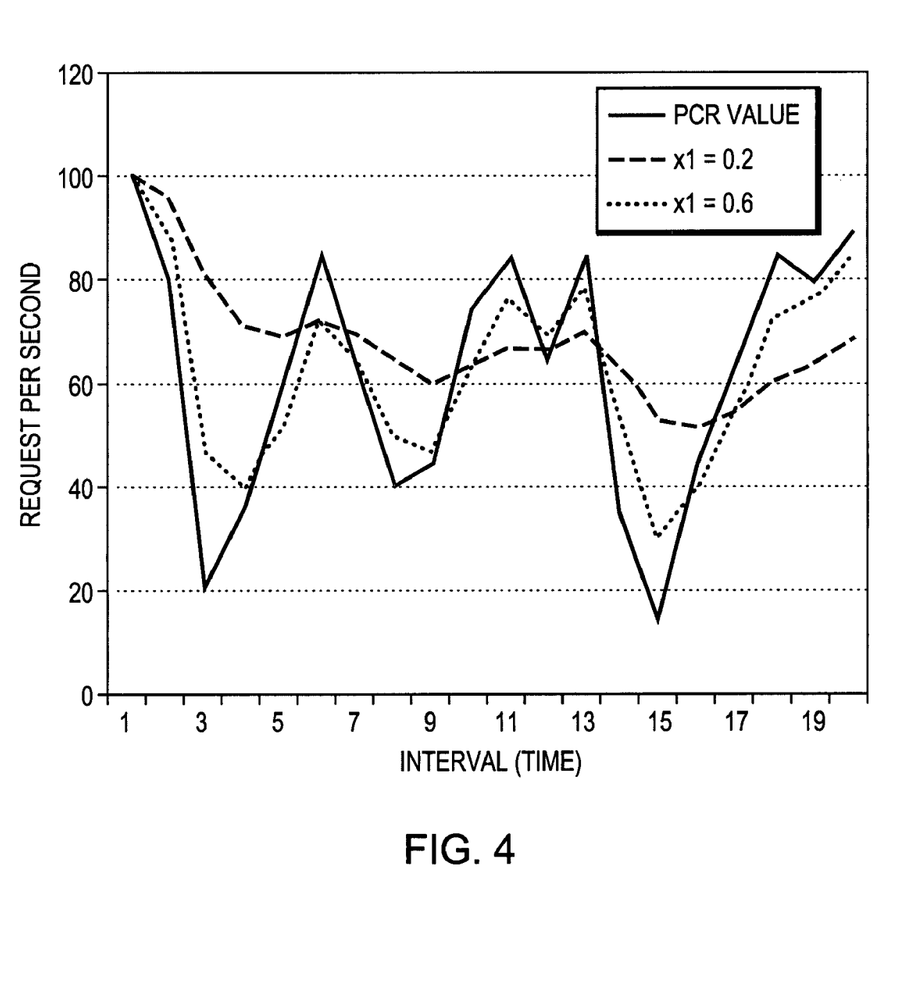
FIG. 4 is a graphical example of different advertised path computation resource (PCR) values in accordance with the present invention.

An example of how different values for x1 can affect the advertised PCR value can be seen in the graph depicted in FIG. 4. In FIG. 4, a current PCR value is shown over time as a solid line in an oscillating pattern. In accordance with the example equation above, two separate values for x1 are plotted against the actual PCR of the PCE; 0.2 as a dashed line and 0.6 as a dotted line. It is clear that the 0.6 dotted line more closely mirrors the actual value of the PCR, and creates a substantially similar oscillation effect. While this is a more accurate line, some networks may not be equipped to handle such oscillation. By using a value for x1 equal to 0.2, it can be seen by the dashed line that the advertised PCR is more level and less oscillating than the actual PCR. It should be understood that FIG. 4 is meant to be shown only as an example, and that the current PCR Value line may not represent an actual network reaction to previous PCR values according to the PCE selection methods set forth in the present invention.

Figure 5:
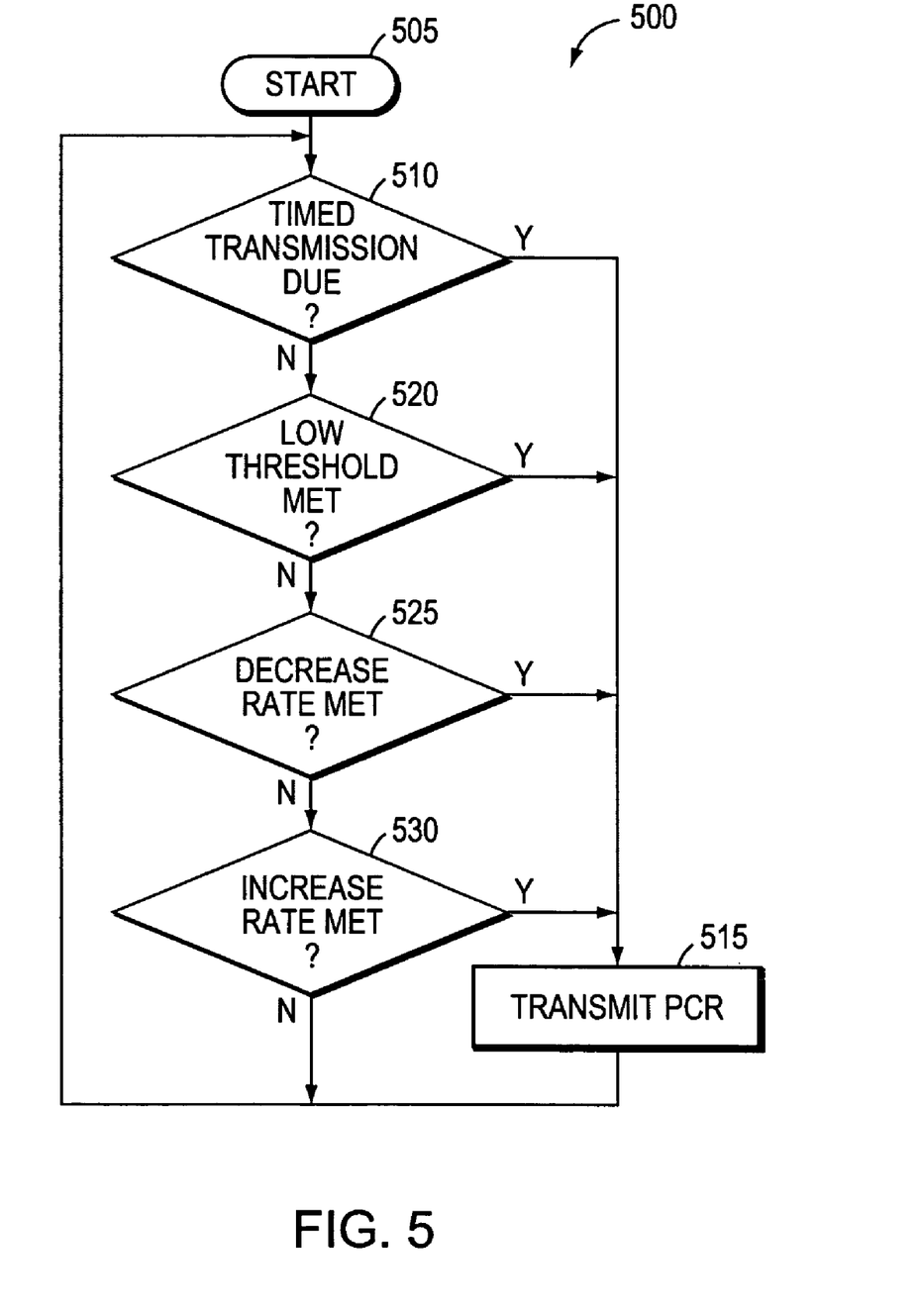
FIG. 5 is a flowchart illustrating a sequence of steps for determining when a PCR is to be transmitted from a Path Computation Element (PCE) in accordance with the present invention.

FIG. 5 is a flowchart illustrating a sequence of steps for determining when a PCR (LSA advertisement) is to be transmitted from the PCE. The sequence 500 begins at step 505 and proceeds to step 510 where the PCE process 245 checks to determine if a timed transmission is due. It should be noted that a method for transmitting the advertisement may be to transmit on a timed interval, such as every millisecond, second or minute, etc. If a timed transmission is due, then an advertisement bearing the PCR is transmitted at step 515. While this method is functional, it does not account well for the rate of change of the PCRs. For instance, an IGP (or PCE) enabled router may be configured to transmit conventional LSAs once every half-hour, although it may be desirable to transmit the PCRs contained within the LSAs more frequently. If the change is rapid and the time interval is long, the delay until the next transmission may be too slow to accommodate proper adjustments. If the rate of change is slow and the time interval is short, the advertisements might create excessive and unnecessary control plane churn through the network. For this reason, sequence 500 provides for alternate threshold determinations.

In particular, steps 520 through 530 are provided to compensate for dynamic changes to the PCR values. At step 520, the PCE process 245 determines whether a low threshold has been met (attained). If so, the PCE transmits the PCR in step 515. Attainment of this low threshold allows the PCE to promptly send a notification in order to immediately reduce the number of path computation requests received from the PCCs. It is advantageous in this case not to wait until the PCE is unable to process any more requests for reasons obvious to those skilled in the art. Instead, a low threshold representing the number of remaining available requests may be chosen by an administrator to prevent the PCE from utilizing 100% of its available resources. It should be noted that in this or any circumstance, a PCE may transmit a PCR that advertises zero remaining resources, so as to stop receiving any path computation requests. One such circumstance is during an initialization phase, as described above.

If the threshold is not met, in step 525, the PCE process checks for a decrease in available resources equal to or greater than a preset decrease amount, 'x2'. If this preset decrease amount is met, the PCE transmits the new PCR in step 515. For example, if the previous PCR value is eighty requests per second, and x2 is set as a 25% change, a PCR is transmitted when the new PCR is sixty requests per second or less. This threshold is advantageous because it limits the transmission of what an administrator may determine to be unnecessary traffic. For instance, if the previous PCR was eighty requests per second, and the new PCR has only decreased to seventy-nine requests per second, it may not be desirable to transmit such a minimal change in PCR value. It should be noted that the preset decrease amount x2 may also be set as a certain amount below the previous PCR, such as a twenty request per second change for the above example, or other rate of change determination.

If, on the other hand, the available PCE resources have increased, in step 530 the PCE process checks for a change equal to or greater than a preset increase amount, 'x3'. Again, using the above example, if x3 is set to a 25% change, a new PCR is transmitted at step 515, once the new PCR value reaches one hundred requests per second or greater. Again, the preset increase amount may also be set as a certain amount above the previous PCR value or other rate of change determination. It should be understood by those skilled in the art that the preset decrease and increase amounts, x2 and x3, may be set to different values. It may be desirable, for instance, to set the preset decrease amount at a smaller percentage than the preset increase amount, because it may be more desirable to advertise rapid decreases than rapid increases in available resources for reasons those skilled in the art will appreciate. The sequence then returns to step 510.

PCE Selection

Based on the dynamically advertised PCR, the PCC selects a PCE to service its path computation request based on the PCE's advertised capabilities and PCR. The advertised capabilities of a PCE are considered because not all PCEs may be capable of performing the requested path computation. In the case of multiple available PCE "candidates," the advertised PCR metric is used to select an appropriate PCE to service the request. Moreover, if the PCC requests multiple path computations in connection with a set of path computation requests, those requests may be apportioned among the multiple available PCE candidates to attain an optimal PCE response time. To that end, this aspect of the invention further provides a novel PCE selection algorithm that effectively load balances the set of requests among the PCE candidates in proportion to their advertised PCR ratios.

Figure 6:
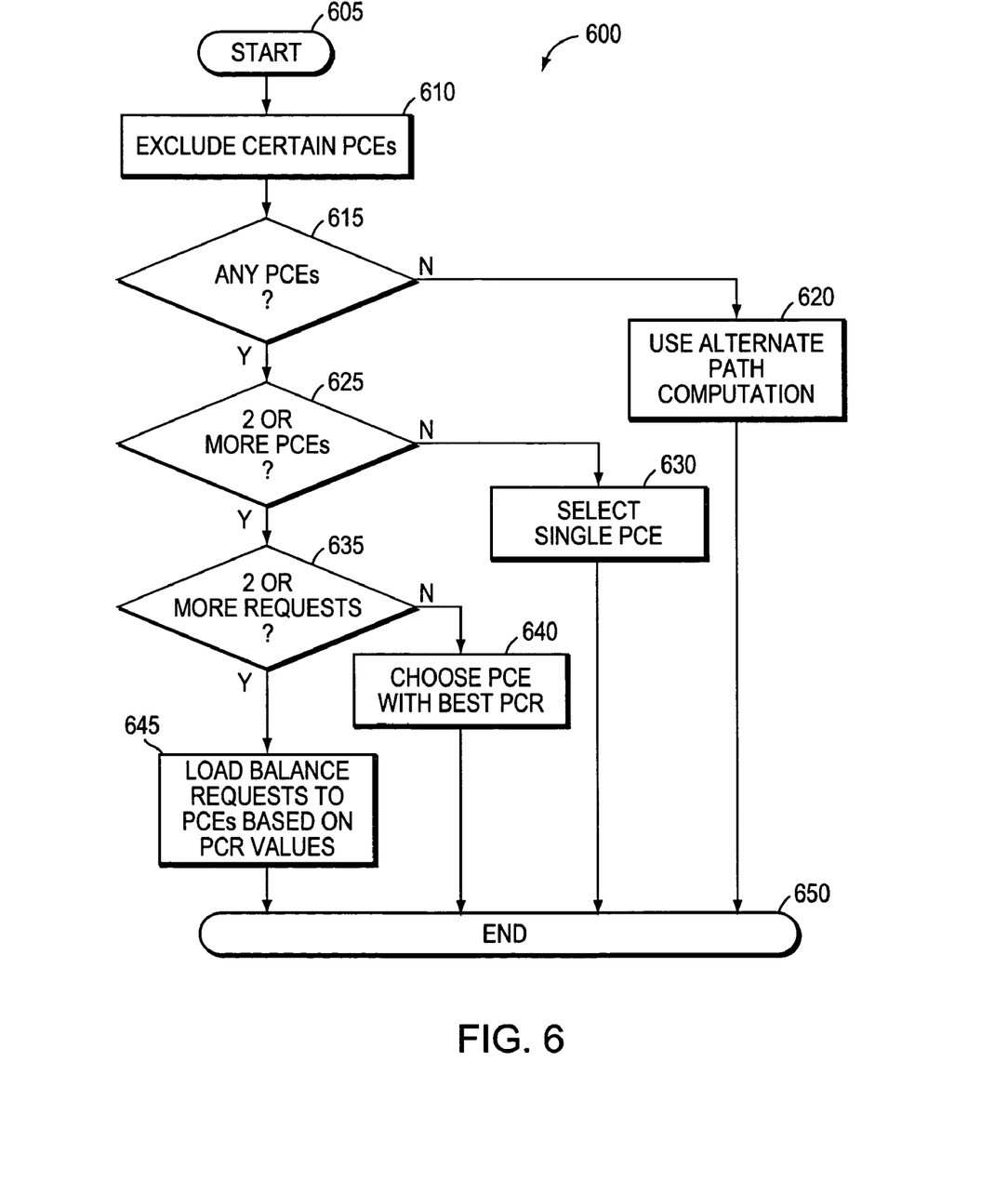
FIG. 6 is a flowchart illustrating a sequence of steps for selecting one or more PCEs in accordance with the present invention.

FIG. 6 is a flowchart illustrating a sequence of steps for selecting one or more PCEs in accordance with the present invention. The sequence 600 begins at step 605 and continues to 610, where the PCC excludes certain PCEs that, e.g., have advertised zero available resources. A PCE may also be excluded if the path computation request has characteristics that the PCE is not equipped to handle. For instance, some PCEs may not be capable of satisfying path diversity computation. Such capabilities may generally be advertised in a PCED LSA (advertisement) as described above.

Once any unavailable PCEs are removed as options, in step 615 the PCC process 245 checks to determine if any PCE candidates remain. If not, in step 620 the PCC may employ an alternate means of path computation, such as loose path routing or others known to those in the art. If there is at least one PCE available in step 615, a determination is made as to whether there are multiple PCEs from which to choose (step 625). If there is only one PCE available, that PCE is selected in step 630. For example, in FIG. 1B, while router C may use either ABR3* or ABR4 as border routers, only ABR3* is configured as a PCE. Because of this, Router C may only choose ABR3* as the PCE, so it can either select ABR3*, or else not use a PCE. Conversely, in FIG. 1B, Router A may have the choice between ABR1* or ABR2* as the PCE to serve a request for a path to Router C. It is important to note, also, that an available PCE must have access to the destination in order to be a viable option. Referring also to FIG. 1A, it can be seen that if router B were trying to reach router D, the only available PCE is ASBR6*, because ASBR5* has no access to AS4, which contains the destination router D.

If it is determined that more than one PCE is available (step 625), the PCC resolves the number of path computation requests it wishes to send out in step 635. If the number of requests is not equal to two or more requests (i.e. a single request), then the PCC process 245 chooses the best PCE based on the PCR in step 640. In this step, the best PCE may the PCE that has advertised a PCR with a load metric showing the highest availability, such as the highest available requests per second, or lowest average request response time, etc. If, on the other hand, the number of requests is equal to two or more, in step 645, load balancing may be performed between the multiple PCEs based on the advertised PCR values to determine which PCEs receive which requests. For example, if in FIG. 1A router A has received PCRs from PCEs ASBR1* and ASBR2* as one hundred requests per second availability and fifty requests per second availability, respectively, router A load balances its requests to both PCEs roughly proportioned to the PCRs (2:1). If, in this example, router A has twelve requests, it would send eight to ASBR1* and four to ASBR2*. If the number of requests cannot be directly proportioned, a rounding may take place (e.g. ten requests may be divided into six and four, or seven and three, etc.). Other known load balancing techniques may also be used, and such methods are within the scope and protection of the present invention. Once it has been determined which requests are sent to which PCE(s), or if an alternate path computation approach is used, the sequence ends at step 650. The PCC may then utilize the PCE-based path computation protocols described above to obtain desired paths.

Advantageously, the novel technique efficiently selects an appropriate PCE to compute a path, such as a Traffic Engineering (TE) label switched path (LSP), between nodes of a network to thereby reduce a set-up time for the TE LSP. TE LSP set-up times are generally critical to TE sensitive applications and, thus, reduction of those times are desirable. By selecting an appropriate PCE, or, in the case of multiple PCEs, efficiently load balancing a set of requests among the PCEs, PCE overload is obviated, thus reducing the TE LSP set-up time for a computed path.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for selecting one or more Path Computation Elements (PCEs) to compute a path between nodes of a computer network, the method comprising the steps of:
   receiving dynamic advertisements of path computation capabilities and of available path computation resources of a plurality of PCEs at a Path Computation Client (PCC) in the network, the path computation capabilities describing an ability to compute one or more types of paths and the available path computation resources being internal computation resources that may be employed to compute the one or more types of paths;
   based on the advertisements, excluding from the plurality of PCEs any PCEs that are incapable of computing a desired type of path to produce a plurality of remaining PCEs;
   determining a number of path computation requests to be sent from the PCC;
   when the PCC has a single path computation request to be sent, selecting the one of the plurality of remaining PCEs to service the path computation request of the PCC that has a highest measure of available path computation resources, and issuing the path computation request from the PCC to the selected one of the remaining PCEs; and
   when the PCC has multiple path computation requests to be sent, determining a ratio between the available computation resources at each of the remaining PCEs, dividing the path computation requests into groups in proportion to the ratio of the available computation resources, and issuing the groups of path computation requests from the PCC to respective ones of the remaining PCEs.

2. The method of claim 1 wherein the path computation resources are dynamically advertised as a path computation resource (PCR) representing a load metric that is relevant to the resources.

3. A system configured to select one or more Path Computation Elements (PCEs) to compute a path between nodes of a computer network, the system comprising:
   a network interface to receive dynamic advertisements of path computation capabilities and of available path computation resources of a plurality of PCEs in the network, the path computation capabilities describing an ability to compute one or more types of paths and the available path computation resources being internal computation resources that may be employed to compute the one or more types of paths;
   a processor; and
   a Path Computation Client (PCC) process executed by the processor to
      based on the advertisements, exclude from the plurality of PCEs any PCEs that are incapable of computing a desired type of path to produce a plurality of remaining PCEs,
      determine a number of path computation requests to be sent by the PCC process,
      when the PCC process has a single path computation request to be sent, select the one of the plurality of remaining PCEs to service the path computation request of the PCC process that has a highest measure of available path computation resources and issue the path computation request to the selected one of the remaining PCEs, and
      when the PCC process has multiple path computation requests to be sent, determine a ratio between the available computation resources at each of the remaining PCEs, divide the path computation requests into groups in proportion to the ratio of the available computation resources, and issue the groups of path computation request to respective ones of the remaining PCEs.

4. A non-transitory computer readable medium containing executable program instructions for selecting one or more Path Computation Elements (PCEs) to compute a path between nodes of a computer network, the executable program instructions comprising program instructions for:

processing received dynamic advertisements of path computation capabilities and of available path computation resources of a plurality of PCEs at a Path Computation Client (PCC) in the network, the path computation capabilities describing an ability to compute one or more types of paths and the available path computation resources being internal computation resources that may be employed to compute the one or more types of paths;

based on the advertisements, excluding from the plurality of PCEs any PCEs that are incapable of computing a desired type of path to produce a plurality of remaining PCEs;

determining a number of path computation requests to be sent from the PCC;

when the PCC has a single path computation request to be sent, selecting the one of the plurality of remaining PCEs to service the path computation request of the PCC that has a highest measure of available path computation resources, and issuing the path computation request from the PCC to the selected one of the remaining PCEs; and when the PCC has multiple path computation requests to be sent, determining a ratio between the available computation resources at each of the remaining PCEs, dividing the path computation requests into groups in proportion to the ratio of the available computation resources, and issuing the groups of path computation requests from the PCC to respective ones of the remaining PCEs.

5. An apparatus comprising:
one or more network interfaces configured to receive link-state advertisements from a plurality of Path Computation Elements (PCEs), each link-state advertisement to include an indication of path computation capabilities and an indication of available computation resources of a PCE, the path computation capabilities of the PCE describing an ability to compute one or more types of paths between nodes in a computer network, the available computation resources of the PCE being resources that may be employed to compute the one or more types of paths between nodes in the computer network;

a processor; and a memory configured to hold program instructions for a Path Computation Client (PCC) process, the program instructions executable by the processor to
based on the indication of path computation capabilities, exclude from the plurality of PCEs and PCEs that are incapable of computing a desired type of path to produce a plurality of remaining PCEs,
determine a number of path computation requests to be sent by the PCC process,
when the PCC process has a single path computation request to be sent, compare the indications of available computation resources of the plurality of remaining PCEs, select the one of the plurality of remaining PCEs that has a highest availability based upon the comparison of the indications of available computation resources and issue the path computation request to the selected one of the remaining PCEs, and
when the PCC process has multiple path computation requests to be sent, determine a ration between the available computation resources at each of the remaining PCEs, divide the path computation requests into groups in proportion to the ratio of the available computation resources, and issue the groups of path computation request to respective ones of the remaining PCEs.

6. The apparatus of claim 5 wherein the indications of available computation resources include a number of path computation requests that may be computed at each PCE per a period a time.

7. The apparatus of claim 5 wherein the indications of available computation resources include an average service time of a path computation request at each PCE.

8. The apparatus of claim 5 wherein the indications of available computation resources include an indication of central processor unit (CPU) availability at each PCE.

9. The apparatus of claim 5 wherein at least one of the one or more types of paths is selected from the group consisting of local paths, inter-area paths, and multi-domain paths.

10. The apparatus of claim 5 wherein the path is a Traffic Engineering (TE) label switched path (LSP).

11. A method comprising:
receiving, on one or more network interfaces of a Path Computation Client (PCC), link-state advertisements from a plurality of Path Computation Elements (PCEs), each link-state advertisement to include an indication of path computation capabilities and an indication of available computation resources of a PCE, the path computation capabilities of the PCE describing an ability to compute one or more types of paths between nodes in a computer network, the available computation resources of the PCE being resources that may be employed by the PCE to compute the one or more types of paths between nodes in the computer network;

based on the indication of path computation capabilities, excluding from the plurality of PCEs any PCEs that are incapable of computing a desired type of path to produce a plurality of remaining PCEs;

determining a number of path computation requests to be sent by the PCC;

when the PCC has a single path computation request to be sent, comparing the indications of available computation resources of the plurality of remaining PCEs, selecting the one of the plurality of remaining PCEs that has a highest availability based upon the comparison of the indications of available computation resources, and issuing the path computation request to the selected one of the remaining PCEs; and when the PCC has multiple path computation requests to be sent, determining a ratio between the available computation resources at each of the remaining PCEs, dividing the path computation requests into groups in proportion to the ratio of the available computation resources, and issuing the groups of path computation requests to respective ones of the remaining PCEs.

12. The method of claim 11 wherein the indications of available computation resources include a member of path computation requests that may be computed at the PCE per a period a time.

13. The method of claim 11 wherein the indications of available computation resources include an average service time of a path computation request at the PCE.

14. The method of claim 11 wherein the indications of available computation resources include an indication of central processor unit (CPU) availability at the PCE.

15. The method of claim 11 wherein at least one of the one or more types of paths is selected from the group consisting of local paths, inter-area paths, and multi-domain paths.

16. The method of claim 11 wherein the path is a Traffic Engineering (TE) label switched path (LSP).

17. A method comprising:
receiving, on one or more network interfaces of a path computation client (PCC), link-state advertisements from a plurality of Path Computation Elements (PCEs) in a computer network, each link-state advertisement to include an indication of path computation capabilities and an indication of available computation resources of a PCE, the path computation capabilities describing an ability of the PCE to compute one or more types of paths and the available computation resources of the PCE being resources that may be employed by the PCE to compute a path between nodes in a computer network in response to a path computation request;

based on the indication of path computation capabilities, excluding from the plurality of PCEs any PCEs that are incapable of computing a desired type of path to produce a plurality of remaining PCES;

comparing, at the PCC, the indications of available computation resources of the plurality of remaining PCEs;

determining a ratio between the available computation resources at each of the PCEs of the plurality of remaining PCEs;

determining, at the PCC, a number of path computation requests to be sent from the PCC;

when it is determined that the PCC has multiple requests to be sent, dividing the path computation requests into groups in proportion to the ratio of the available computation resources, and issuing the groups of path computation requests from the PCC to the remaining PCEs such that PCEs of the plurality of remaining PCEs that have greater available computation resources receive more path computation requests from the PCC than PCEs of the plurality of remaining PCEs that have lesser available resources; and when it is determined that the PCC has a single request to be sent, issuing a single path computation request from the PCC to one of the PCEs of the plurality of remaining PCEs having an indication of available computation resources that indicates a greatest amount of available computation resources.

* * * * *

UNITED STATES PATENT AND TRADEMARK OFFICE
CERTIFICATE OF CORRECTION

PATENT NO. : 8,131,873 B2  
APPLICATION NO. : 10/983280  
DATED : March 6, 2012  
INVENTOR(S) : Jean-Philippe Vasseur Page 1 of 1

It is certified that error appears in the above-identified patent and that said Letters Patent is hereby corrected as shown below:

Col. 15, line 18: "to service ~~the~~ a path computation request of the PCC that"

Col. 15, line 47: "exclude from the plurality of PCEs ~~and~~ any PCEs that are"

Col. 15, line 58: "resources and ~~issue~~ the path computation request"

Col. 15, line 61: "requests to be sent, determine a ~~ration~~ ratio between the"

Col. 16, line 51: "available computation resources include a ~~member~~ number of path"

Col. 17, line 15: "a plurality of remining ~~PCES;~~ PCEs:"

Signed and Sealed this  
First Day of May, 2012

David J. Kappos  
*Director of the United States Patent and Trademark Office*